UNITED STATES PATENT OFFICE.

ROBERT WEIDEN, OF NEW YORK, N. Y.

IMPROVEMENT IN COATED STEEL SPRINGS FOR FURNITURE.

Specification forming part of Letters Patent No. 151,638, dated June 2, 1874; application filed March 3, 1874.

*To all whom it may concern:*

Be it known that I, ROBERT WEIDEN, of the city, county, and State of New York, have invented an Improved Spring, of which the following is a specification:

This invention is more particularly designed for furniture and other like springs, usually of helical construction, and made from steel in the place of iron, brass, or copper wire; and consists in a steel spring of helical form, made by first dipping the wire of which it is made, and before the same is converted into a spring, in oil, then baking it in an oven to give it the necessary temper and protection against corrosion, afterward winding it as required, and subsequently compressing and setting the spring, whereby a stronger or better and anti-corrosive steel spring is produced.

Previously to describing my invention, I will observe that attempts have been made and patents obtained for substituting steel for iron, brass, or copper wire, including steel wire springs, made by winding the wire upon blocks, in the usual manner, giving such wound spring the ordinary pressing or set, then dipping the spring in a japan varnish, and, after draining, baking it in an oven, also including a spring subjected to set or compression after it is tempered. My invention, however, essentially differs from these and other methods in preparing the wire before making into a spring, essentially as hereinbefore specified, and afterward winding it upon the blocks and giving it the necessary compression or set.

In carrying out my invention, the wire, while in a loose state or before assuming the shape of a spring, is dipped in linseed or other oil, and afterward baked in an oven to give it the necessary temper and protection against corrosion, after which it is wound as required, and compressed or set, thereby producing a much better tempered and stiffer spring, of any required size or form that it may be desired to make, from the steel wire thus previously protected by a non-corrosive coating and tempered.

I claim—

A helical steel spring made by first dipping the wire, before baking and winding, in oil, then baking it, afterward winding it into its required spring shape, and subsequently compressing and setting the spring so produced, substantially as specified.

ROBERT WEIDEN.

Witnesses:
BENJAMIN W. HOFFMAN,
MICHAEL RYAN.